US010491644B2

(12) United States Patent
Cornell

(10) Patent No.: US 10,491,644 B2
(45) Date of Patent: Nov. 26, 2019

(54) SYSTEMS AND METHODS TO PRESENT RESPONSES TO AN EVENT IN A SOCIAL NETWORK

(71) Applicant: Facebook, Inc., Menlo Park, CA (US)

(72) Inventor: Alex Douglas Cornell, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 553 days.

(21) Appl. No.: 14/964,482

(22) Filed: Dec. 9, 2015

(65) Prior Publication Data

US 2017/0171267 A1    Jun. 15, 2017

(51) Int. Cl.
*G06F 3/0481*   (2013.01)
*G06F 3/0482*   (2013.01)
*H04L 29/06*    (2006.01)
*G06T 13/80*    (2011.01)
*G06Q 10/00*    (2012.01)
*G06Q 50/00*    (2012.01)
*G06Q 10/10*    (2012.01)
*G06Q 30/02*    (2012.01)

(52) U.S. Cl.
CPC ......... *H04L 65/4076* (2013.01); *G06Q 10/00* (2013.01); *G06Q 10/10* (2013.01); *G06Q 30/0203* (2013.01); *G06Q 50/01* (2013.01); *G06T 13/80* (2013.01); *G06T 2200/24* (2013.01)

(58) Field of Classification Search
CPC .................... G06F 11/3466; G06F 17/5022
See application file for complete search history.

(56) References Cited

U.S. PATENT DOCUMENTS

| | | | |
|---|---|---|---|
| 2006/0224593 A1* | 10/2006 | Benton | G06F 17/30864 |
| 2013/0282616 A1* | 10/2013 | Grimsley | G06Q 40/06 |
| | | | 705/36 R |
| 2014/0279418 A1* | 9/2014 | Rubinstein | G06Q 40/00 |
| | | | 705/39 |
| 2015/0067556 A1* | 3/2015 | Tibrewal | G06F 17/30598 |
| | | | 715/765 |
| 2016/0048492 A1* | 2/2016 | Barrett | G06F 17/241 |
| | | | 715/233 |
| 2016/0358207 A1* | 12/2016 | Montaque | G06Q 30/0245 |
| 2017/0083174 A1* | 3/2017 | Tobens, III | G06F 3/0482 |

* cited by examiner

*Primary Examiner* — Rayeez R Chowdhury
(74) *Attorney, Agent, or Firm* — Sheppard Mullin Richter & Hampton LLP

(57) ABSTRACT

Systems, methods, and non-transitory computer readable media are configured to receive responses from users over a spectrum of approval levels. The users can be participating in an event broadcasted by a social networking system. The responses can be processed to generate an aggregate count of responses at each approval level in the spectrum. A layout animation can be presented in a user interface reflecting the aggregate count of responses at each approval level in the spectrum.

20 Claims, 9 Drawing Sheets

SYSTEMS AND METHODS TO PRESENT RESPONSES TO AN EVENT IN A SOCIAL NETWORK

FIELD OF THE INVENTION

The present technology relates to the field of content provision. More particularly, the present technology relates to techniques for presenting responses to a broadcasted event across a social networking system.

BACKGROUND

Today, people often utilize computing devices for a wide variety of purposes. Users can use their computing devices, for example, to communicate and otherwise interact with other users. Such interactions are increasingly popular over a social networking system.

Interactions in a social networking system may include the sharing of content. In some instances, users can utilize the social networking system as a platform to broadcast an event to an audience of fans and other interested users. The audience can have the ability to provide certain feedback to the event and its associated content. In some instances, a member of the audience can like the event. In other instances, a member of the audience can comment on the event or share the event with another user.

SUMMARY

Various embodiments of the present technology can include systems, methods, and non-transitory computer readable media configured to receive responses from users over a spectrum of approval levels. The users can be participating in an event broadcasted by a social networking system. The responses can be processed to generate an aggregate count of responses at each approval level in the spectrum. A layout animation can be presented in a user interface reflecting the aggregate count of responses at each approval level in the spectrum.

In an embodiment, the spectrum of approval levels includes at least three approval levels.

In an embodiment, each approval level n the spectrum of approval levels is associated with a distinct emoji.

In an embodiment, each approval level in the spectrum of approval levels is associated with a group of bars having a length based on the aggregate count of responses.

In an embodiment, the spectrum of approval levels is associated with a continuous transition of colors.

In an embodiment, the animation can be modified to reflect an aggregate count of responses over the spectrum of approval levels for each predetermined time interval during at least a portion of the event.

In an embodiment, the animation presented in a user interface for a user can be modified to temporarily reflect receipt of responses from the user.

In an embodiment, a plurality of distinct emojis can be presented in response to an input gesture relating to dragging along the user interface at various positions associated with a plurality of approval levels.

In an embodiment, projectiles having a color corresponding to an element associated with an approval level can be presented in response to an input gesture applied to the element. A color of a mood bar can be changed based on the color of the projectiles.

In an embodiment, the processing the responses comprises weighting responses of users based on settings selected by at least one of a broadcaster or the social networking system. An aggregate count of responses can be calculated based on the weighted responses.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
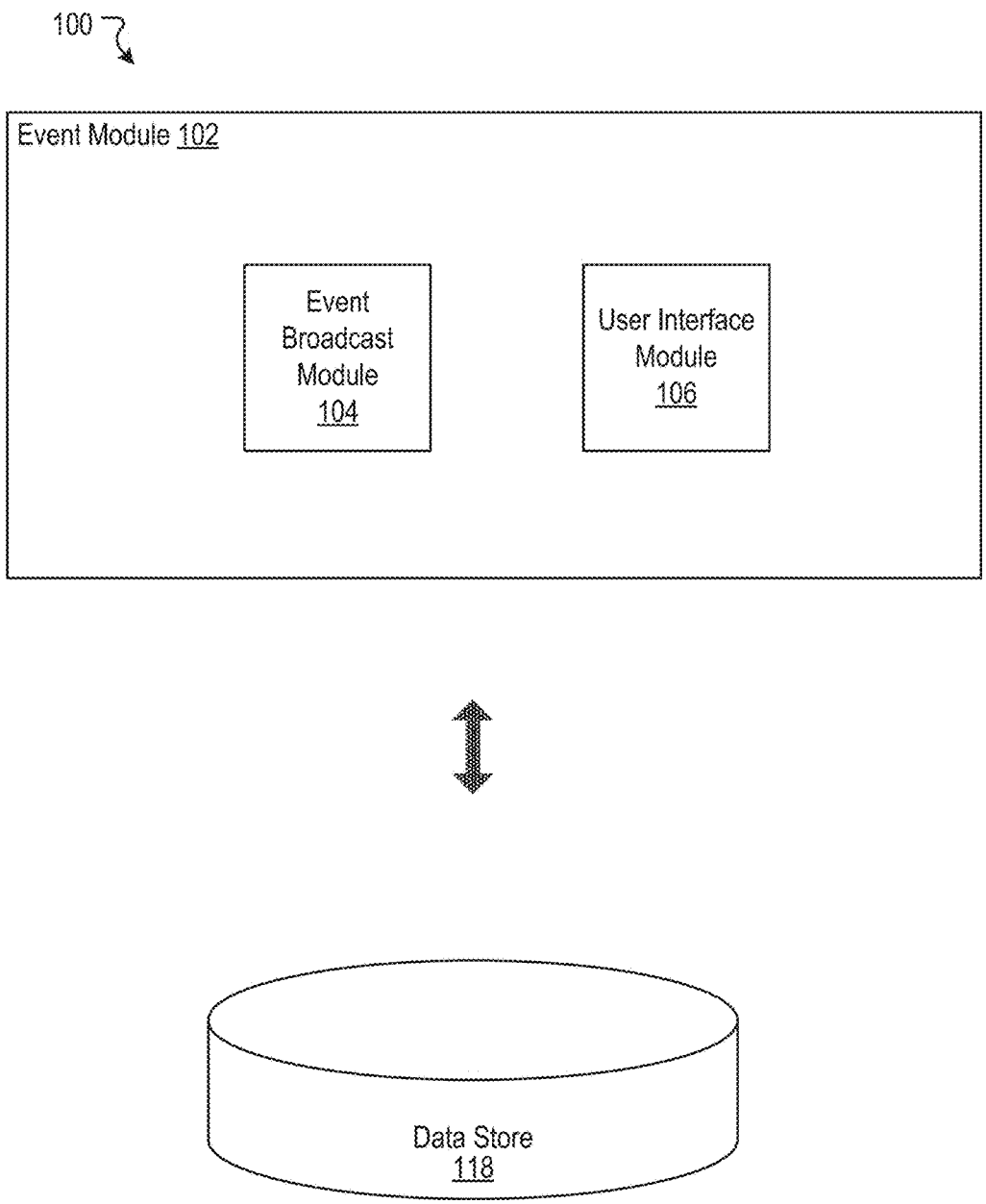
FIG. 1 illustrates a system including an example event module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Presenting Responses to an Event Through a User Interface

As mentioned, interactions in a social networking system may include the sharing of content. In some instances, public figures can utilize the social networking system as a platform to broadcast an event to an audience of fans and other interested users. The audience can have the ability to provide certain feedback to the event and its associated content. In some instances, a member of the audience can like the event. In other instances, a member of the audience can comment on the event or share the event with another user.

The participation of various types of audience members in a broadcast event and their feedback to the event can be difficult to discern. For an audience member, it can be difficult to know the combined feedback of other audience members who are participating in the event as the event transpires. The difficulty is especially acute because participation in the event is online and because the number of audience members can be large. Likewise, a broadcaster also may not be able to determine the aggregate feedback of audience members during the event. Some conventional techniques may only provide the ability to provide individual feedback of an audience member. Further still, some conventional techniques may allow a limited option to provide unhelpful, binary feedback in the form of satisfactory versus unsatisfactory, as an example.

An improved approach rooted in computer technology to manage response information relating to an online event broadcasted by a social networking system overcomes these and other disadvantages associated with conventional approaches implemented in computer technology. Systems, methods, and computer readable media of the present technology can provide a user interface to present a layout animation to an event broadcaster or an audience member (or user) in real time (or near real time) to reflect aggregate responses, such as emotional feedback, of audience members to the event as the event transpires. The aggregate responses can be measured by an aggregate count of responses provided by audience members through the user interface at a plurality of approval levels along a spectrum of approval levels. In some embodiments, the spectrum of approval levels can range from strong approval to strong disapproval. In some instances, the spectrum can have three or more approval levels. A user can provide responses at a selected approval level by providing user input gestures, such as clicking, tapping, or dragging at the selected approval level. In some instances, when a user provides responses at one or more approval levels, the layout animation can indicate to the user the provision of such responses by the user before the animation returns to a state reflecting the aggregated count of responses. The layout animation can reflect at regular predetermined time intervals (or continuously) a contemporaneous aggregate count of responses in the animation so that changes in response information are consistently reflected thereby. One example of a layout animation can be an animation of a graph having a plurality of groups of bars that correspond with various approval levels. The groups of bars can extend in proportion to an aggregate count of responses at the approval levels. Each approval level can be represented, for example, by a unique or distinct emoji (or emoticon). Another example of a layout animation can be an animation of an array of elements associated with approval levels and a mood bar that dynamically reflects a color associated with an element selected by a user. The selection of the element triggers the movement of projectiles having the same color toward the mood bar. In response to the movement of such projectiles, the mood bar can reflect the color of the projectiles. More details regarding the present technology are described herein.

An event can be any type of occurrence or activity. For example, an event can be a performance (e.g., a concert), a sports game (e.g., Superbowl), an entertainment spectacle (e.g., the Oscars), a presentation (e.g., a lecture), a political (e.g., White House inauguration) or social (e.g., Papal visit) occurrence, etc. An event can be associated with a large audience or a small audience. An event can occur in real life or before a community of interested users on a communications platform, such as a social networking system, or both. Although some of the examples discussed herein may relate to certain events, the present technology can be implemented for any and all suitable types of other events. More details regarding the present technology are discussed herein.

FIG. 1 illustrates an example system 100 including an example event module 102 configured to provide aggregated response information of audience members, or users, participating in an online broadcast event through a layout animation presented on a user interface, according to an embodiment of the present technology. The layout animation can include a plurality of approval levels along a spectrum of approval levels. In some embodiments, the spectrum can range from a most positive approval level to a most negative approval (disapproval) level. The response information can include aggregate responses of users to the event at various approval levels along the spectrum as the event transpires. The response information can represent emotional feedback of users in response to the event as the event transpires. The response information presented by the layout animation through the user interface can be provided in real time (or near real time) to a user participating in the event or a broadcaster associated with the event.

The event module 102 can include an event broadcast module 104 and a user interface module 106. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the event module 102 can be implemented in any suitable combinations.

The event broadcast module 104 can support an online broadcast of an event by a broadcaster through an associated page on a social networking system to various users constituting audience members. The event broadcast module 104 can allow an administrator of a page associated with the broadcaster to conduct a live broadcast of an event managed by the broadcaster. The broadcast can be implemented as a real time (or near real time) stream of the event as the event transpires to client computing devices associated with the users. The stream can include video, audio, or both relating to the event. The event broadcast module 104 can support a live stream of the event to a selected group of audience members. The audience members can include various types of users of the social networking system. For example, based on privacy settings selected by the page, the audience members can be users who have been invited by the page to participate in the event. As another example, if the page has selected appropriate privacy settings, the audience members also can include any users of the social networking system who have chosen to participate in the event as audience members. The stream can be provided to users for consumption through various platforms running on a client computing devices, such as an app provided by the social networking system or a web browser.

The user interface module 106 can provide a user interface through which a layout animation reflecting user response information can be presented. The user interface module 106 can create a plurality of layout animations. The layout animations can reflect a spectrum of approval levels at which response information can be provided by users. The layout animations can reflect aggregate responses provided by the users at various approval levels in response to event content as the event transpires. At continuous times or periodic time intervals, responses of users can be aggregated and reflected in the layout animations. The layout animations can change as the magnitude of responses at various approval levels change over predetermined time intervals. Responses provided by an individual user during the event can cause a layout animation presented to the user to contemporaneously indicate the responses provided by the user. The user interface module 106 is discussed in more detail herein.

In some embodiments, the event module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the event module 102 can be, in part or in whole, implemented as software running on one or more computing devices or systems, such as on a server or a client computing device. For example, the event module 102 can be, in part or in whole, implemented within or configured to operate in conjunction or be integrated with a social networking system (or service), such as a social networking system 630 of FIG. 6. As another example, the event module 102 can be implemented as or within a dedicated application (e.g., app), a program, or an applet running on a user computing device or client computing system. In some instances, the event module 102 can be, in part or in whole, implemented within or configured to operate in conjunction or be integrated with client computing device, such as a user device 610 of FIG. 6. It should be understood that many variations are possible.

A data store 118 can be configured to store and maintain various types of data, such as the data relating to support of and operation of the event module 102. The data can include data relating to, for example, a video (and audio) of a broadcasted event, layout animations, individual user responses, aggregate response information based on predetermined time intervals, emojis and emoticons, etc. The data store 118 also can maintain other information associated with a social networking system. The information associated with the social networking system can include data about users, social connections, social interactions, locations, geofenced areas, maps, places, events, groups, posts, communications, content, account settings, privacy settings, and a social graph. The social graph can reflect all entities of the social networking system and their interactions. As shown in the example system 100, the event module 102 can be configured to communicate and/or operate with the data store 118.

Figure 2:
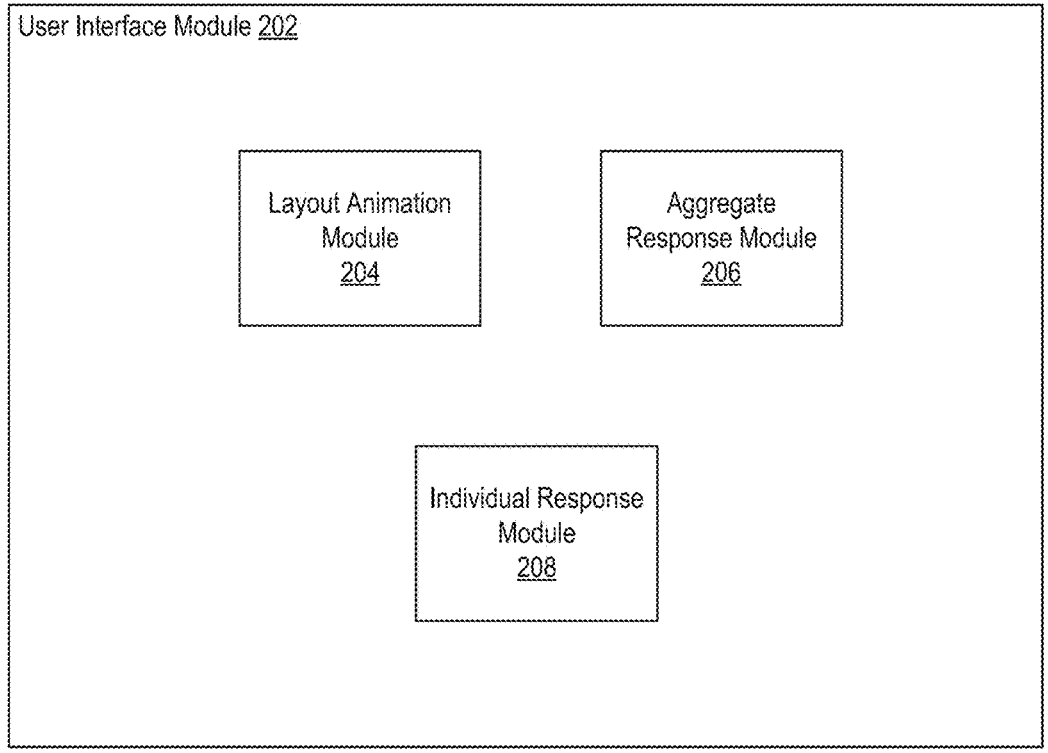
FIG. 2 illustrates an example user interface module, according to an embodiment of the present technology.

FIG. 2 illustrates an example user interface module 202, according to an embodiment of the present technology. In some embodiments, the user interface module 106 of FIG. 1 can be implemented with the user interface module 202. The user interface module 202 can include a layout animation module 204, a user input module 206, and an aggregate response module 208.

The layout animation module 204 can provide animated templates constituting layouts of animations for presenting aggregate responses of users participating in an event and responses of an individual user. A layout animation can be presented through a user interface of a client computing device associated with a broadcaster or a user. The layout animation can reflect responses of users and changes to such responses over time. A layout animation can reflect a spectrum of approval levels at which users can provide responses. The spectrum of approval levels can include a plurality of approval levels. In some embodiments, the plurality of approval levels can be greater than or equal to three approval levels so that the disadvantages of binary feedback can be overcome. A user can select an approval level by appropriate interaction with the user interface and provide responses at the selected approval level. In response to the responses, the layout animation can dynamically alter its presentation to reflect such responses. In addition, the user can apply changes to her selection of approval levels over a duration of an event according to her sentiments regarding the event. In response to such changes, the layout animation can dynamically alter its presentation to reflect such changes. In some embodiments, the layout animation can present aggregate responses of users in a graphical, pictorial, or otherwise visual manner without presentation of numerical values. Aggregate responses of users can be processed by the aggregate response module 206, as discussed in more detail herein. Responses of an individual user can be processed by the individual response module user input module 208, as discussed in more detail herein.

The layout animation module 204 can create a variety of layout animations. In some embodiments, the layout animation module 204 can create an emoji layout animation. The emoji layout animation can present a spectrum of approval levels at which users can provide responses. The emoji layout animation can resemble a bar graph such that each approval level along the spectrum can be associated with a group of bars (or one bar). Each approval level can be associated with a visual representation of user approval at the level. In some embodiments, the visual representation of each approval level can be an emoji (or emoticon). In some embodiments, the emojis can be selected by the user from a menu of emojis presented through the user interface. In one example, approval levels can be selected at various positions along a slider (or user input axis). In one instance, the slider can be oriented to be substantially perpendicular to the direction of the groups of bars. In one example, the slider can be positioned below the groups of bars. The length of bars in a group of bars at each approval level can be a contemporaneous reflection of a count of responses of users at the approval level for a predetermined time interval.

In the emoji layout animation, the groups of bars associated with the approval levels can be coded by color or some other designation. In the example of color, at one end of the spectrum, the approval level can be associated with a group of bars having a first color (or first color range) associated with strong approval (e.g., green). At the other end of the spectrum, the approval level can be associated with a group of bars having a second color (or second color range) associated with strong disapproval (e.g., red). Each approval level between the two ends can be associated with a group of bars having a unique or distinct color (or tone) such that all of the groups of bars in the spectrum reflect a smooth or continuous color transition across the spectrum. The emoji associated with an approval level can reflect a color corresponding to the approval level.

The emoji layout animation can allow a user to select an approval level along a spectrum of approval levels by appropriate user input. In some embodiments, appropriate user input can include, for example, placement of a cursor, a mouse click, tap on a screen, or other input gesture at the desired approval level along or within a threshold distance from the slider. The emoji layout animation can include many variations.

In one variation of the emoji layout animation that includes a slider to continuously present various emojis, selection of an approval level can cause presentation of an emoji associated with the approval level. In this variation; the user can drag the input gesture or reposition the input gesture along the slider to change selection of approval levels. Dragging the input gesture across a plurality of approval levels can cause the user interface to continuously present one or more emojis that move according to a direction of the dragging (e.g.; right horizontal or left horizontal). In one example, the emojis can appear and move below the groups of bars in the spectrum. In another example, the emojis can appear and move above the group of bars. During movement of the emoji in connection with the dragging; the user interface can present each emoji associated with each approval level to which the user has dragged. In one example, dragging causes the emoji to have an increased size, and cessation of the dragging can cause the emoji to return to a default size.

In another variation of the emoji layout animation that includes statically positioned emojis, an emoji associated with each approval level of the spectrum is continuously presented. A user can select an approval level along a spectrum of approval levels by appropriate input gesture with an associated emoji. Selection of the emoji can cause the emoji to temporarily increase in size from a default size to an increased size, and to return to the default size.

With respect to an emoji layout animation, each input gesture at an approval level can correspond to a response by the user at the approval level. Each additional input gesture also can correspond to a response at the approval level. In some examples, when a cursor is left at or on an approval level or emoji without clicking or tapping, responses at the associated approval level can be automatically created at regular intervals. At each approval level, a total count of responses of users participating in the event can be determined over the course of the event.

The emoji layout animation can reflect responses of users participating in the event at predetermined time intervals. For a predetermined time interval (e.g., 100 milliseconds, 500 milliseconds, etc.), an aggregate count of responses of users at each approval level can determined and reflected in the length of an associated group of bars. The length of a group of bars associated with an approval level can be proportional to an aggregate count of responses at the approval level. As the aggregate count of responses at an approval level changes, the emoji layout animation can modify the length of an associated group of bars based on the changes. For example, if an aggregate count of responses at an approval level at an earlier predetermined time interval is relatively high, then the animation can present the associated group of bars as relatively long. Further to the example, if an aggregate count of responses at the approval level at a later predetermined time interval is relatively low, then the animation can change so that the associated group of bars is relatively short. The animation can continuously modify its appearance, including the length of the groups of bars, to reflect a most recent aggregate count of responses.

In some embodiments, the emoji layout animation for a user can present an animation that is unique to each user. In this regard, when the user performs input gestures to create responses at an approval level, the spectrum reflecting an aggregate count of responses can be modified to reflect to the user the input gestures specifically performed by the user. In some embodiments, a group of bars associated with an approval level where the user has provided one or more responses can increase in length in relation to (e.g., in proportion to) the number of such responses. For example, if a user taps at a particular approval level or on an emoji, the group of bars associated with the approval level can temporarily increase in length by a predetermined amount to indicate to the user that the response of the user has been received. Similar to the preceding example, if a user in fast succession taps twice (or more times) at a particular approval level or on an emoji, the group of bars associated with the approval level can temporarily increase in length by more than the predetermined amount and in proportion to the number of taps. In some embodiments, the emoji layout animation for a broadcaster can present the spectrum reflecting aggregate responses of users without modifications to show input gestures of any particular user.

In some embodiments, the layout animation module 204 can create an arcade layout animation. Like the emoji layout animation, the arcade layout animation can present a spectrum of approval levels at which users can provide responses. The spectrum of approval levels can be represented in the animation as an array of elements with each approval level corresponding to an element. The array of elements can be presented in a predetermined position, such as a line of elements. In some embodiments, the elements can be coded by color or some other designation. In the example of color, at one end of the spectrum, the corresponding approval level can be associated with a color indicating strong approval and, at the other end of the spectrum, the corresponding approval level can be associated with a color indicating strong disapproval. Each approval level between the two ends can be associated with elements reflecting a distinct color.

The arcade layout animation can allow a user to select an approval level along a spectrum of approval levels by appropriate user input. In some embodiments, appropriate user input can include, for example, placement of a cursor, a mouse click, tap on a screen, or other input gesture at the desired approval level. An input gesture applied to an element can cause the arcade layout animation to project projectiles from the element toward a mood bar. For example, each tap on an element can cause a predetermined number of projectiles to emanate from the element. In one instance, the position of the array of elements in the arcade layout animation can be below the mood bar and the projectiles can move in a substantially upward direction. In some embodiments, the projectiles can reflect the color of the element from which they have been projected. The mood bar can receive the projectiles and assume the color reflected in the projectiles. In this manner, the mood bar can reflect the levels of approval selected by the user.

With respect to the arcade layout animation, each input gesture at an approval level can correspond to a response by the user at the approval level. Each additional input gesture also can correspond to a response at the approval level. In some examples, when a cursor is left on an element without clicking or tapping on the element, responses at the associated approval level in the form of one or more projectiles can be automatically created at regular intervals.

The arcade layout animation can reflect responses of users participating in the event. For a predetermined time interval (e.g., a 100 milliseconds, 500 milliseconds, etc.), an aggregate count of responses of users at each approval level can determined and reflected in the mood bar. The color of the mood bar can be determined based on processing of aggregate counts of responses at various approval levels. For example, based on an aggregate count of responses at the approval levels for a predetermined time interval, the mood bar can reflect the color associated with the approval level with the highest count of responses. As another example, based on an aggregate count of unique responses at the approval levels, the mood bar can reflect the color associated with the approval level with the highest count of unique responses. Many other examples are possible.

In some embodiments, the arcade layout animation for a user can present an animation that is unique to each user. When the user performs input gestures to create responses at an approval level, the projectiles associated with the responses can be presented to the user. In some embodiments, the arcade layout animation for a broadcaster need not present the array of elements and projectiles associated with selection of an element. For example, the arcade layout animation for a broadcaster can include only the mood bar.

In other embodiments, the layout animation module 204 can create other layout animations. Some of the layout animations can be variations of the layout animations discussed in more detail herein. For example, in one variation, input gestures can be applied along a color coded spectrum of groups of bars associated approval levels. An emoji can appear above the groups of bars as a user slides horizontally along a user interface presenting the animation. As another example, in another variation, an emoji corresponding to an approval level can appear based on a location of an input gesture on the user interface. For example, an input gesture applied to a top right portion (or quadrant) of the user interface can correspond to an approval level associated with an emoji and an input gesture applied to a top left portion of the user interface can correspond to another approval level associated with another emoji. Many variations are possible.

The aggregate response module 206 can process responses from users participating in the event for presentation in accordance with a layout animation. In some embodiments, the aggregate response module 206 can determine a total count of responses at an approval level received from some or all users participating in an event. The total count can be performed for a predetermined time interval. In some embodiments, the aggregate response module 206 can determine a total count of unique responses at an approval level received from users during a predetermined time interval. In these embodiments, when multiple responses of a particular user at an approval level are generated within a predetermined time interval, only one response of the user can be counted.

In some embodiments, a response can be weighted based on preferences of a broadcaster of an event or a social networking system supporting the broadcasted event. For example, a broadcaster can be presented with configurable settings to allow her to identify certain users (e.g., connections of the broadcasters, verified entities, experts, etc.) whose responses can be weighted more than typical users. Likewise, a broadcaster can be presented with configurable settings to allow her to identify certain users whose responses can be weighted less than typical users. The aggregate response module 206 can account for such settings in calculating an aggregate count of responses for an event.

The total count of responses at an approval level for a predetermined time interval can be reflected in a layout animation. In an emoji layout animation, the aggregate count of responses at an approval level can be reflected in a corresponding length of a group of bars associated with the approval level. In an arcade layout animation, the aggregate count of responses at an approval level can be reflected in a mood bar.

The individual response module 208 can process responses from an individual user participating in the event for presentation to the user in accordance with a layout animation. In this way, the individual response module 208 can support presentation of layout animations for a user that are tailored to the user. The individual response module 208 can determine for a predetermined time interval receipt of individual responses from the user at a particular approval level. The receipt of individual responses can be reflected in a layout animation. In an emoji layout animation, the receipt of individual responses at an approval level can be reflected in a contemporaneous temporary increase in the length of a group of bars associated with the approval level to indicate to the user receipt of the responses. In an arcade layout animation, the receipt of the individual responses at an approval level can be reflected in the projection of projectiles from a corresponding element to a mood bar.

Figure 3A:
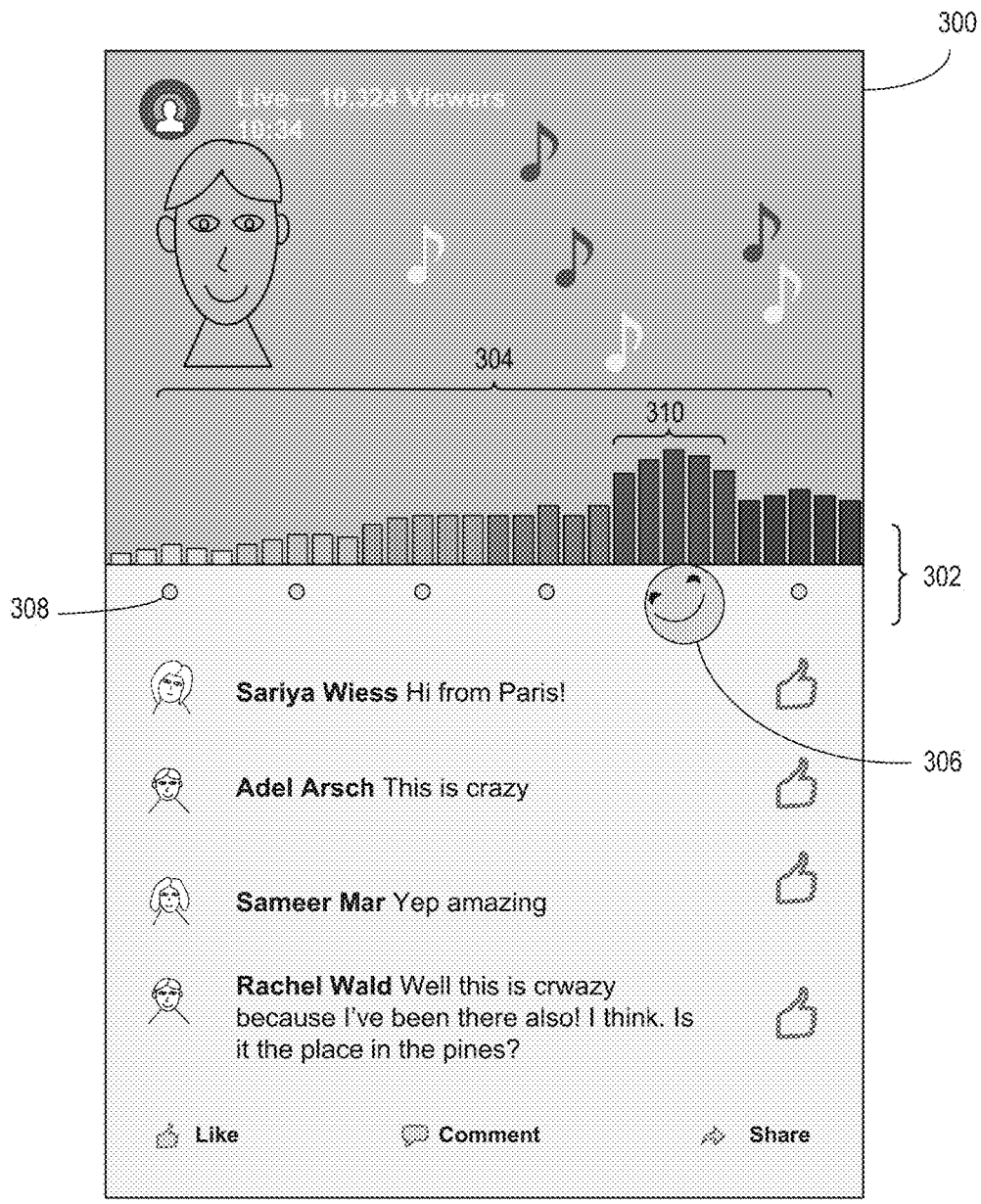
FIG. 3A illustrates a first example user interface for presenting responses to an event, according to an embodiment of the present technology.

FIG. 3A illustrates an example user interface 300 presented on a screen of a computing device of a user participating in an event broadcasted to an audience of a social networking system, according to an embodiment of the present technology. The user interface 300 presents an emoji layout animation that can provide aggregate response information as the event transpires. The emoji layout animation can allow an input gesture, such as tapping or dragging, to be applied to a spectrum of approval levels 302 associated with various emojis. The approval levels along the spectrum of approval levels 302 can be associated with groups of bars 304. The groups of bars 304 can be color coded. In the example shown, six approval levels are reflected along the spectrum of approval levels 302. In other examples, any suitable number of approval levels can be reflected. The groups of bars 304 in the spectrum of approval levels 302 can change in length over time based on changes in aggregate counts of responses of users at each approval level for progressing predetermined time intervals.

As shown, the user has applied an input gesture, such as a tap, at an approval level corresponding to an emoji 306 during a predetermined time interval. In the example shown, the emoji 306 is an emoji with a smiling face. The input gesture has caused the group of bars 310 associated with the emoji 306 to temporarily increase in length to indicate to the user that the input gesture by the user has been received. After the temporary increase in length to the group of bars 310, the group of bars 310 can return to a length that is based on an aggregate count of response of all users who provided responses at the approval level during the time interval. In the example shown, the group of bars 310 includes five bars. In other examples, any suitable number of bars can be used. Further, in some examples, a number of bars for each group of bars need not be constant but rather can vary within a layout animation. In the example shown, the group of bars 310 has bars of approximately the same length with a middle bar that is slightly longer in length. In other examples, for an input gesture by an individual user or for an aggregate count of users at a particular approval level, the bars in an associated group of bars can be the same length or different lengths.

An input gesture involving dragging along the spectrum of approval levels 302 can cause selection of other approval levels and resulting presentation of emojis associated with the approval levels. For example, if a cursor is dragged to a position 308 along the spectrum of approval levels 302, four additional emojis can appear in succession during the dragging as the cursor is sequentially positioned in a location corresponding to a distinct approval level. When the cursor arrives at the position 308, an emoji, such as an emoji with a frowning face, can appear. The layout animation presented in the user interface 300 presents aggregate responses of users in a graphical, pictorial, or otherwise visual manner without presentation or appearance of numerical values.

Figure 3B:
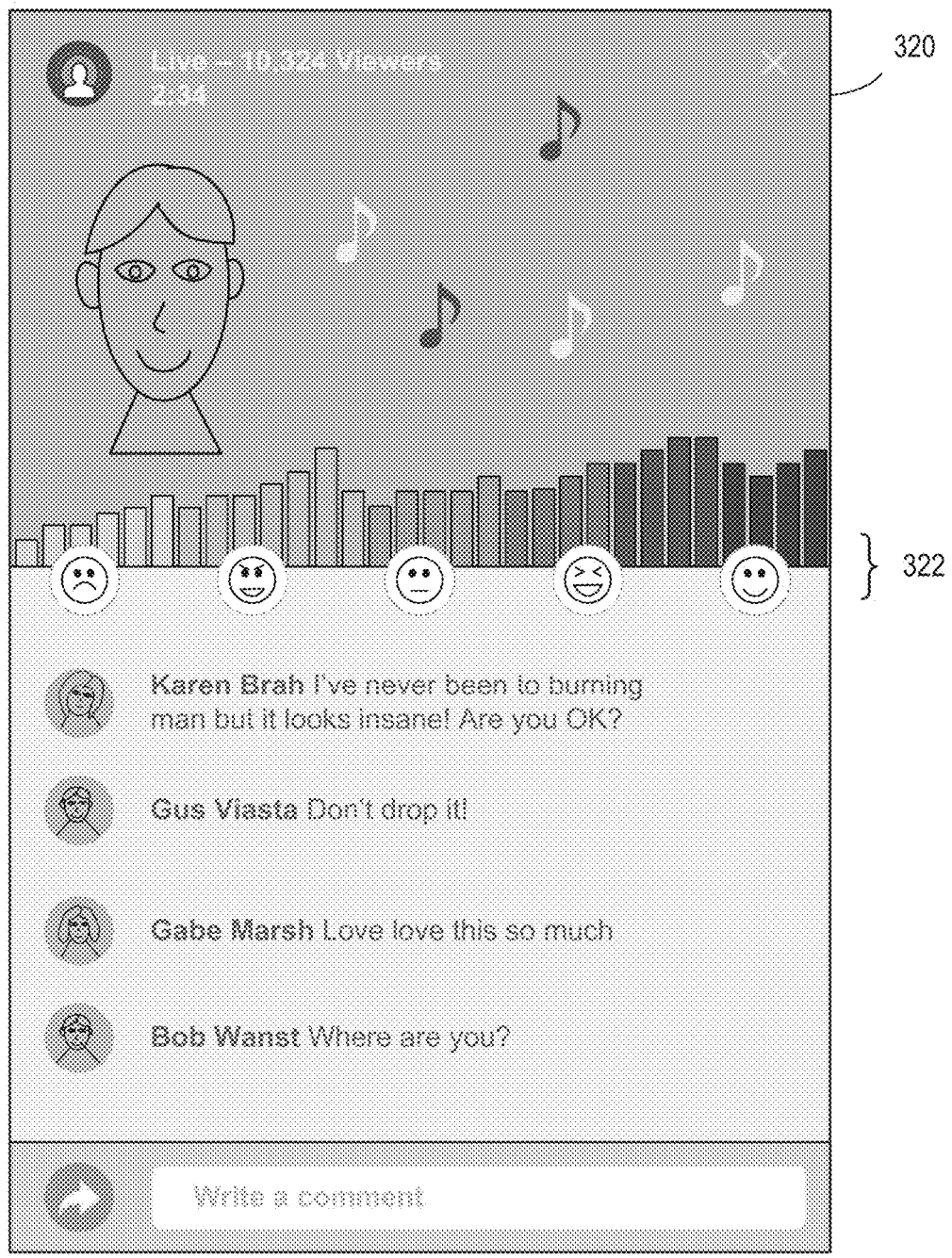
FIG. 3B illustrates a second example user interface for presenting responses to an event, according to an embodiment of the present technology.

FIG. 3B illustrates an example user interface 320 presented on a screen of a computing device of a user participating in an event broadcasted to an audience of a social networking system, according to an embodiment of the present technology. The user interface 320 can present an emoji layout animation that includes statically positioned emojis. The behavior of the animation presented in the user interface 320 can be similar to the behavior of the animation presented in the user interface 300 in FIG. 3A. In the user interface 320, emojis 322 are statically positioned to correspond with approval levels along a spectrum of approval levels. When a user wishes to provide a response at an approval level, an input gesture can be applied to the associated emoji.

Figure 3C:
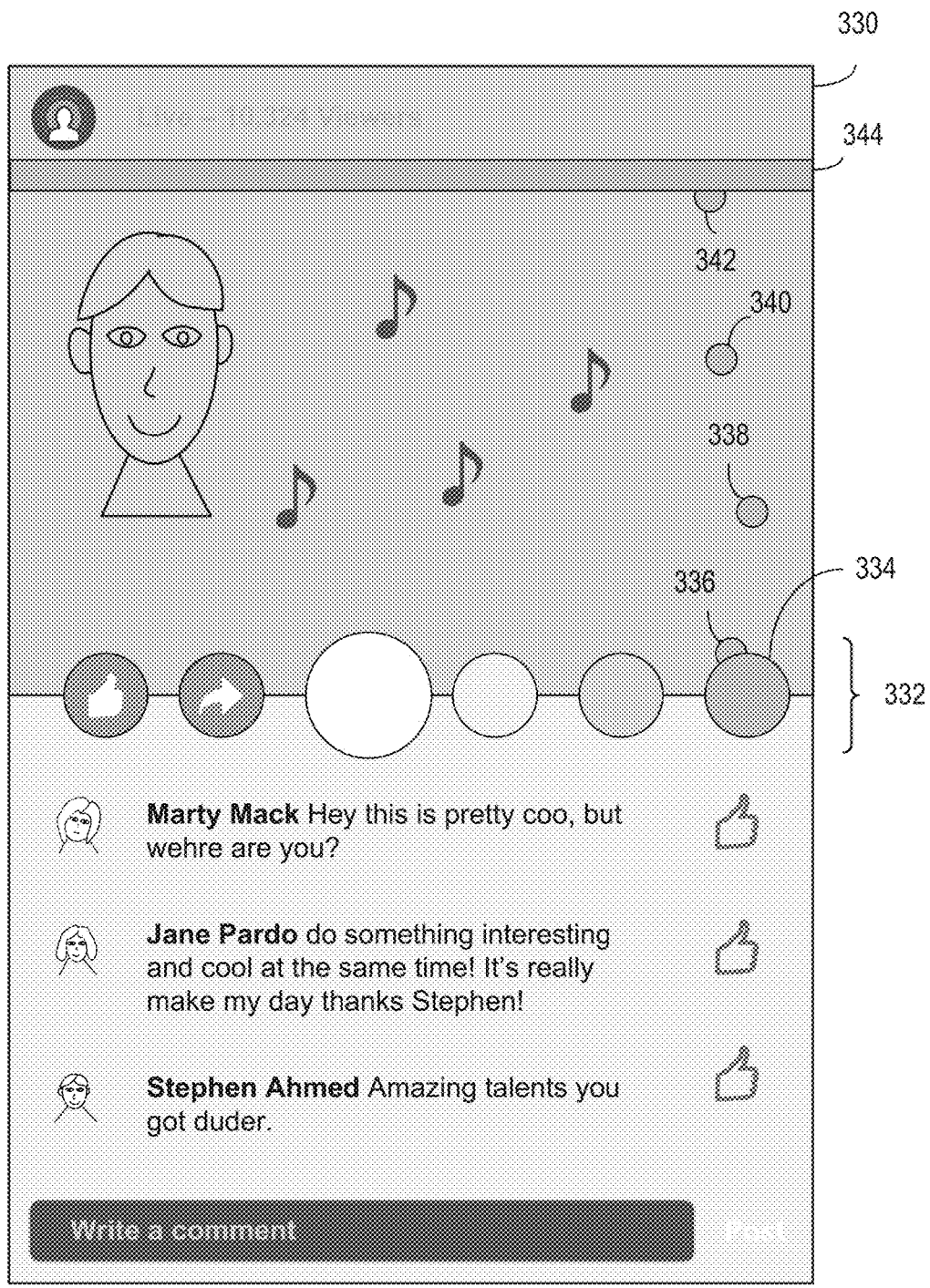
FIG. 3C illustrates a third example user interface for presenting responses to an event, according to an embodiment of the present technology.

FIG. 3C illustrates an example user interface 330 presented on a screen of a computing device of a user participating in an event broadcasted to an audience of a social networking system, according to an embodiment of the present technology. The user interface 330 can present an arcade layout animation that allows a user to provide responses to the event by input gestures applied to an array of elements 332 that correspond to various approval levels. The array of elements 332 can be color coded such that each element reflects a distinct color. When an input gesture, such as a tap, is applied to an element 334 in the array of elements 332, the animation can cause projectiles 336, 338, 340, 342 associated with the element 332 to project upward toward a mood bar 344. The projectiles 336, 338, 340, 342 can reflect the same color as the element 336. Based on the receipt of one or more projectiles, such as the projectile 342, the mood bar 344 can reflect the same color as the received projectiles. In this manner, the mood bar 344 can represent an aggregate indication of approval level at a predetermined time interval.

Figure 4:
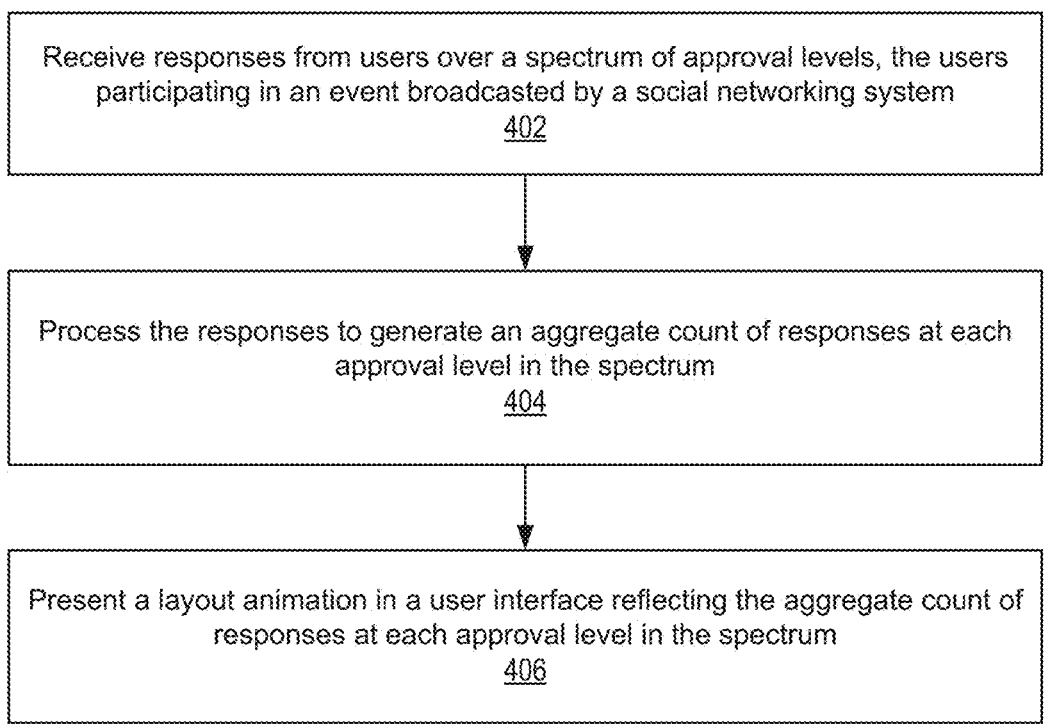
FIG. 4 illustrates a first method to present responses to an event, according to an embodiment of the present technology.

FIG. 4 illustrates a first example method 400 to present a layout animation to represent an aggregate count of user responses, according to an embodiment of the present technology. It should be appreciated that there can be additional, fewer, or alternative steps performed in similar or alternative orders, or in parallel, in accordance with the various embodiments and features discussed herein unless otherwise stated.

At block 402, the method 400 can receive responses from users over a spectrum of approval levels. The users can be participating in an event broadcasted by a social networking system. At block 404, the method 400 can process the responses to generate an aggregate count of responses at each approval level in the spectrum. At block 406, the method 400 can present a layout animation in a user interface reflecting the aggregate count of responses at each approval level in the spectrum. Other suitable techniques that incorporate various features and embodiments of the present technology are possible.

Figure 5:
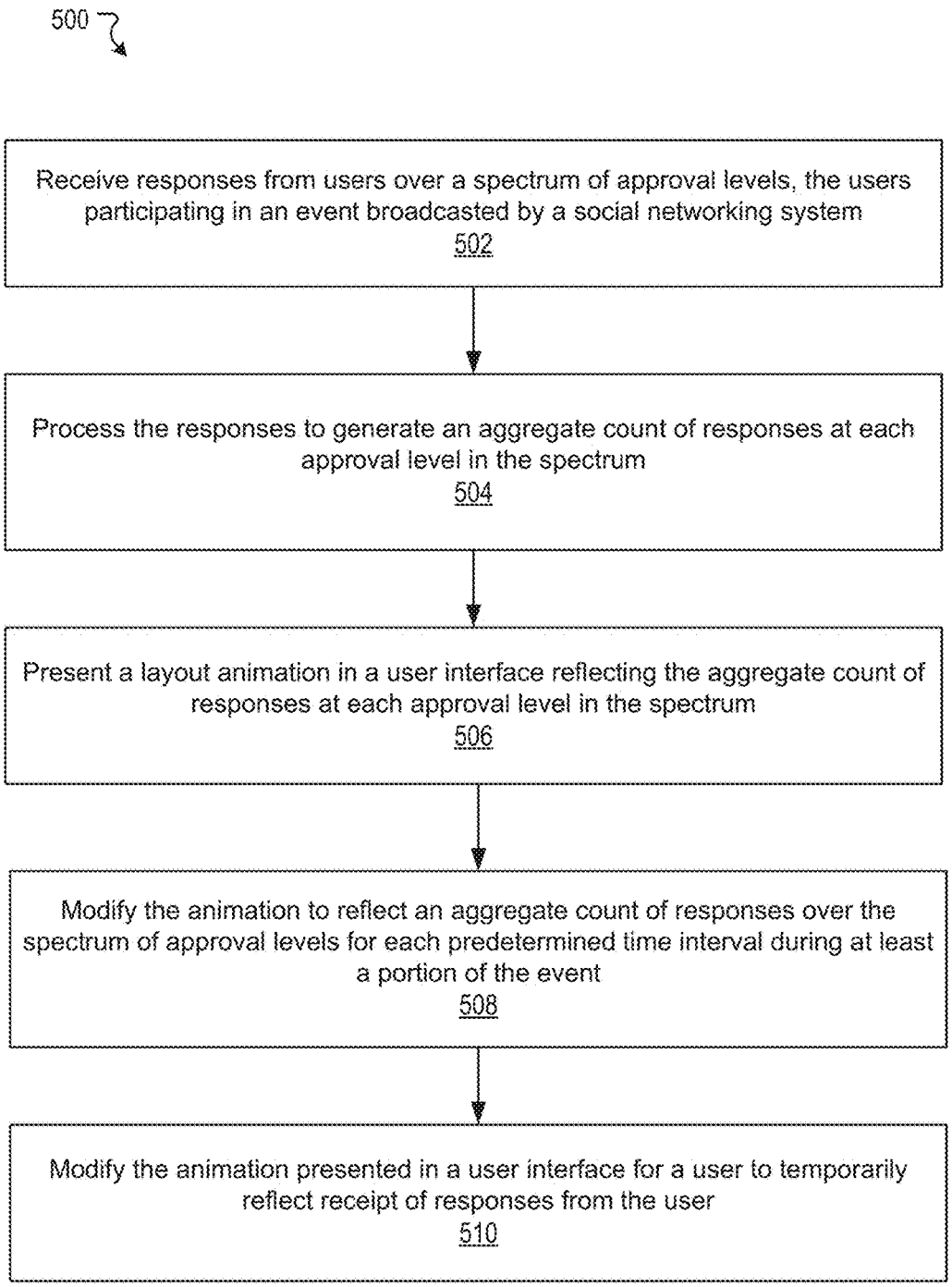
FIG. 5 illustrates a second method to present responses to an event, according to an embodiment of the present technology.

FIG. 5 illustrates a second example method 500 to present a layout animation to represent an aggregate count of user responses, according to an embodiment of the present technology. It should be appreciated that there can be additional, fewer, or alternative steps performed in similar or alternative orders, or in parallel, in accordance with the various embodiments and features discussed herein unless otherwise stated.

At block 502, the method 500 can receive responses from users over a spectrum of approval levels. The users can be participating in an event broadcasted by a social networking system. At block 504, the method 500 can process the responses to generate an aggregate count of responses at each approval level in the spectrum. At block 506, the method 500 can present a layout animation in a user interface reflecting the aggregate count of responses at each approval level in the spectrum. At block 508, the method 500 can modify the animation to reflect an aggregate count of responses over the spectrum of approval levels for each predetermined time interval during at least a portion of the event. At block 510, the method 500 can modify the animation presented in a user interface for a user to temporarily reflect receipt of responses from the user. Other suitable techniques that incorporate various features and embodiments of the present technology are possible.

Social Networking System—Example Implementation

Figure 6:
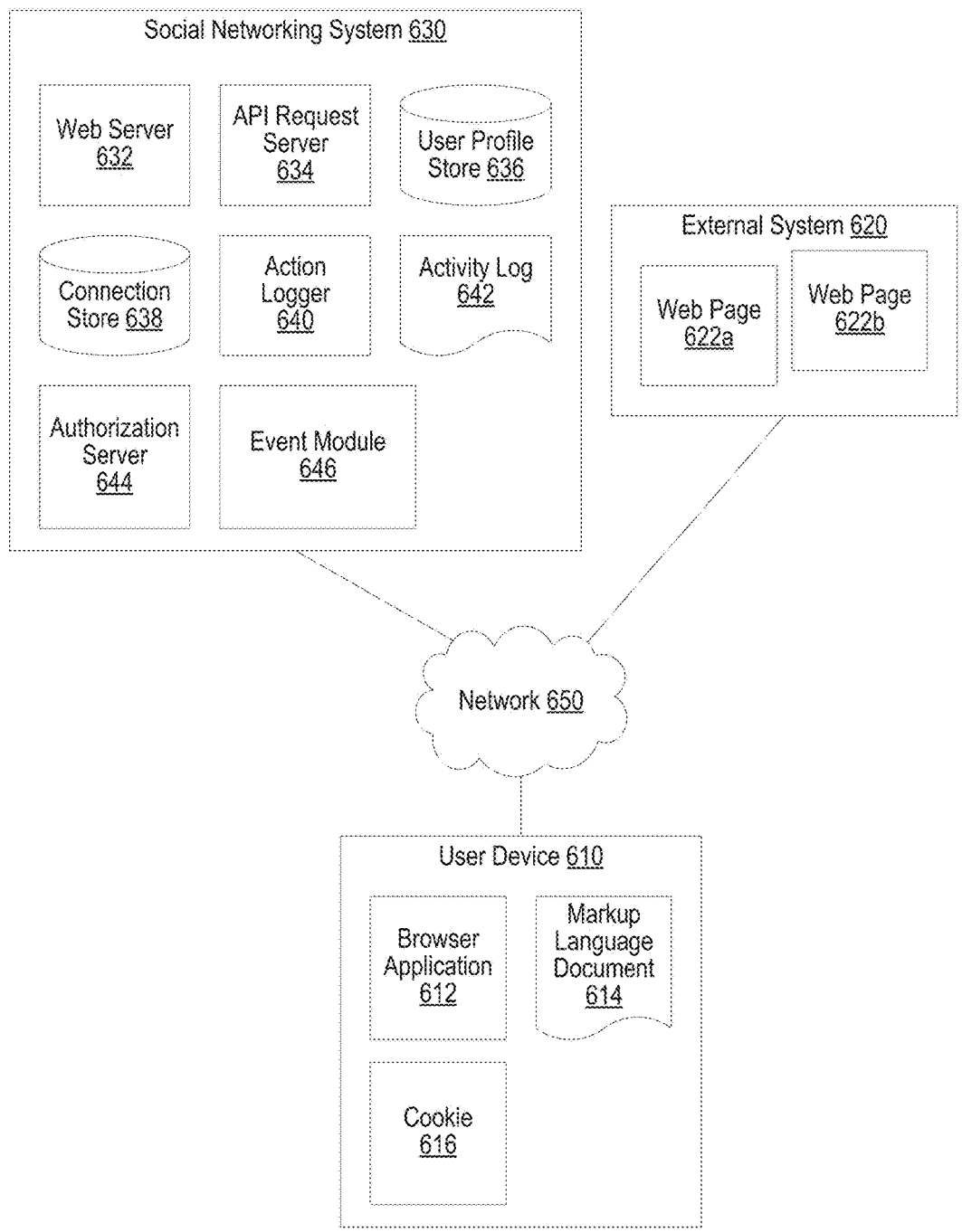
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (VViMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an event module 646. The event module 646 can be implemented with the event module 102, as discussed in more detail herein. In some embodiments, one or more functionalities of the event module 646 can be implemented in the user device 610.

Hardware Implementation

Figure 7:
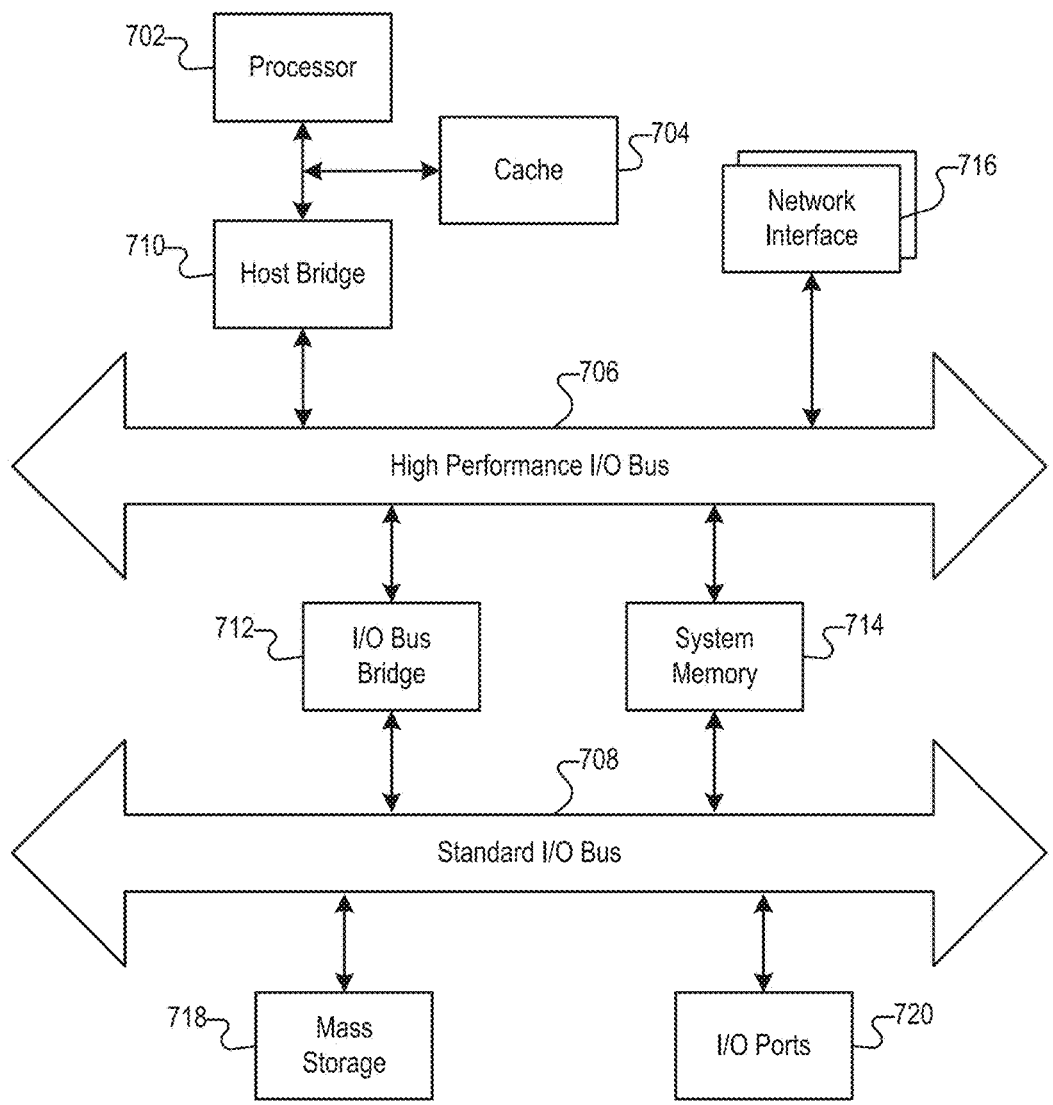
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g.; networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, responses from users over a spectrum of approval levels, the users participating in an event broadcasted by a social networking system;
   processing, by the computing system, the responses to generate an aggregate count of responses at each approval level in the spectrum for a predetermined time interval;
   presenting, by the computing system, a layout animation in a user interface reflecting the aggregate count of responses at each approval level in the spectrum to the users during the event, wherein each approval level in the spectrum of approval levels is associated with an emoji and at least one bar having a length based on the aggregate count of responses;
   receiving, by the computing system, a change to at least one response at an approval level corresponding to a first emoji from at least one user during the event; and
   presenting, by the computing system, a dynamically altered layout animation to the users, wherein the dynamically altered layout animation reflects the change, wherein the layout animation temporarily modifies the length of the at least one bar associated with the first emoji in response to receiving the change to the at least one response.

2. The computer-implemented method of claim 1, wherein the spectrum of approval levels includes at least three approval levels.

3. The computer-implemented method of claim 1, wherein each approval level in the spectrum of approval levels is associated with a distinct emoji.

4. The computer-implemented method of claim 1, wherein each approval level in the spectrum of approval levels is associated with a group of bars having a length based on the aggregate count of responses.

5. The computer-implemented method of claim 1, wherein the spectrum of approval levels is associated with a continuous transition of colors.

6. The computer-implemented method of claim 1, further comprising:
   modifying the layout animation to reflect an aggregate count of responses over the spectrum of approval levels for each predetermined time interval during at least a portion of the event.

7. The computer-implemented method of claim 1, further comprising:
   presenting a plurality of distinct emojis in response to an input gesture relating to dragging along the user interface at various positions associated with a plurality of approval levels.

8. The computer-implemented method of claim 1, further comprising:
   presenting projectiles having a color corresponding to an element associated with an approval level in response to an input gesture applied to the element; and
   changing a color of a mood bar based on the color of the projectiles.

9. The computer-implemented method of claim 1, wherein the processing the responses comprises:
   weighting responses of users based on settings selected by at least one of a broadcaster or the social networking system; and
   calculating an aggregate count of responses based on the weighted responses.

10. A system comprising:
at least one processor; and
a memory storing instructions that, when executed by the at least one processor, cause the system to perform:
receiving, by the system, responses from users over a spectrum of approval levels, the users participating in an event broadcasted by a social networking system;
processing, by the system, the responses to generate an aggregate count of responses at each approval level in the spectrum for a predetermined time interval;
presenting, by the system, a layout animation in a user interface reflecting the aggregate count of responses at each approval level in the spectrum to the users during the event, wherein each approval level in the spectrum of approval levels is associated with an emoji and at least one bar having a length based on the aggregate count of responses;
receiving, by the system, a change to at least one response at an approval level corresponding to a first emoji from at least one user during the event; and
presenting, by the system, a dynamically altered layout animation to the users, wherein the dynamically altered layout animation reflects the change, wherein the layout animation temporarily modifies the length of the at least one bar associated with the first emoji in response to receiving the change to the at least one response.

11. The system of claim 10, wherein each approval level in the spectrum of approval levels is associated with a group of bars having a length based on the aggregate count of responses.

12. The system of claim 10, wherein the instructions cause the system to further perform:
modifying the layout animation to reflect an aggregate count of responses over the spectrum of approval levels for each predetermined time interval during at least a portion of the event.

13. The system of claim 10, wherein the instructions cause the system to further perform:
presenting a plurality of distinct emojis in response to an input gesture relating to dragging along the user interface at various positions associated with a plurality of approval levels.

14. The system of claim 10, wherein the instructions cause the system to further perform:
presenting projectiles having a color corresponding to an element associated with an approval level in response to an input gesture applied to the element; and
changing a color of a mood bar based on the color of the projectiles.

15. The system of claim 10, wherein the processing the responses comprises:
weighting responses of users based on settings selected by at least one of a broadcaster or the social networking system; and
calculating an aggregate count of responses based on the weighted responses.

16. A non-transitory computer-readable storage medium including instructions that, when executed by at least one processor of a computing system, cause the computing system to perform a method comprising:
receiving, by the computing system, responses from users over a spectrum of approval levels, the users participating in an event broadcasted by a social networking system;
processing, by the computing system, the responses to generate an aggregate count of responses at each approval level in the spectrum for a predetermined time interval;
presenting, by the computing system, a layout animation in a user interface reflecting the aggregate count of responses at each approval level in the spectrum to the users during the event, wherein each approval level in the spectrum of approval levels is associated with an emoji and at least one bar having a length based on the aggregate count of responses;
receiving, by the computing system, a change to at least one response at an approval level corresponding to a first emoji from at least one user during the event; and
presenting, by the computing system, a dynamically altered layout animation to the users, wherein the dynamically altered layout animation reflects the change, wherein the layout animation temporarily modifies the length of the at least one bar associated with the first emoji in response to receiving the change to the at least one response.

17. The non-transitory computer-readable storage medium of claim 16, wherein each approval level in the spectrum of approval levels is associated with a group of bars having a length based on the aggregate count of responses.

18. The non-transitory computer-readable storage medium of claim 16, wherein the instructions cause the computing system to further perform:
presenting a plurality of distinct emojis in response to an input gesture relating to dragging along the user interface at various positions associated with a plurality of approval levels.

19. The non-transitory computer-readable storage medium of claim 16, wherein the instructions cause the computing system to further perform:
presenting projectiles having a color corresponding to an element associated with an approval level in response to an input gesture applied to the element; and
changing a color of a mood bar based on the color of the projectiles.

20. The non-transitory computer-readable storage medium of claim 16, wherein the processing the responses comprises:
weighting responses of users based on settings selected by at least one of a broadcaster or the social networking system; and
calculating an aggregate count of responses based on the weighted responses.

* * * * *